No. 797,177. PATENTED AUG. 15, 1905.
W. S. COOK.
DISK PLOW ATTACHMENT.
APPLICATION FILED APR. 18, 1905.

Witnesses,
Chas. E. Chapin.

Inventor;
William S. Cook
By Geo. H. Strong atty

UNITED STATES PATENT OFFICE.

WILLIAM S. COOK, OF SAN JOSE, CALIFORNIA.

DISK-PLOW ATTACHMENT.

No. 797,177.  Specification of Letters Patent.  Patented Aug. 15, 1905.

Application filed April 18, 1905. Serial No. 256,221.

*To all whom it may concern:*

Be it known that I, WILLIAM S. COOK, a citizen of the United States, residing at San Jose, in the county of Santa Clara and State of California, have invented new and useful Improvements in Disk-Plow Attachments, of which the following is a specification.

My invention relates to improvements in disk plows.

It consists, essentially, in means for increasing the tread of the plow and in mechanism by which such increase is effected.

It also comprises details of construction which will be more fully explained by reference to the accompanying drawings, in which—

Figure 1:
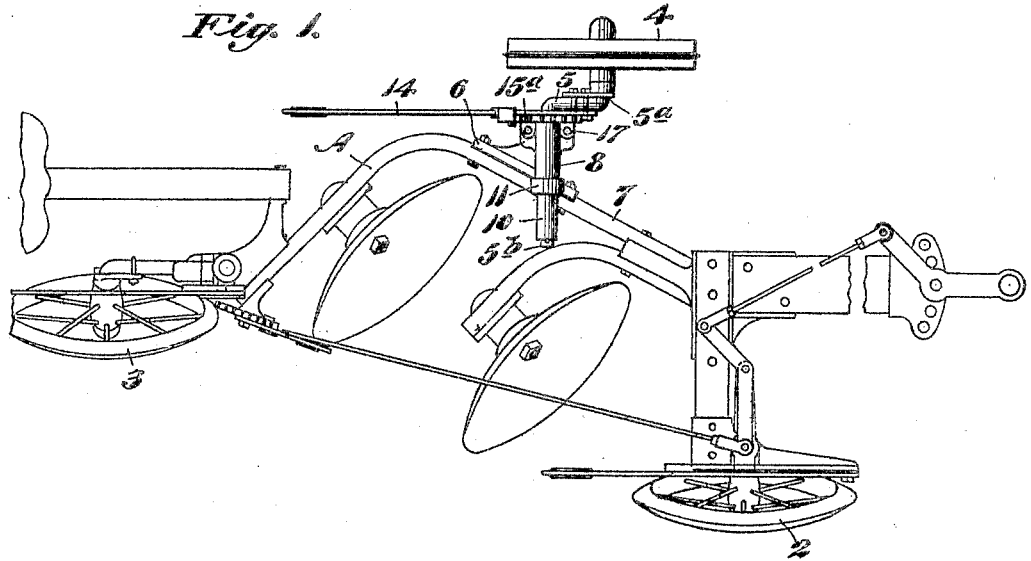
Figure 2:
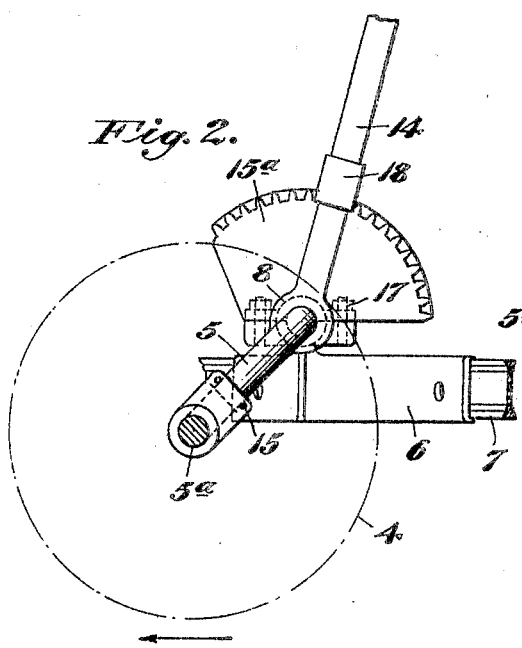
Figure 3:
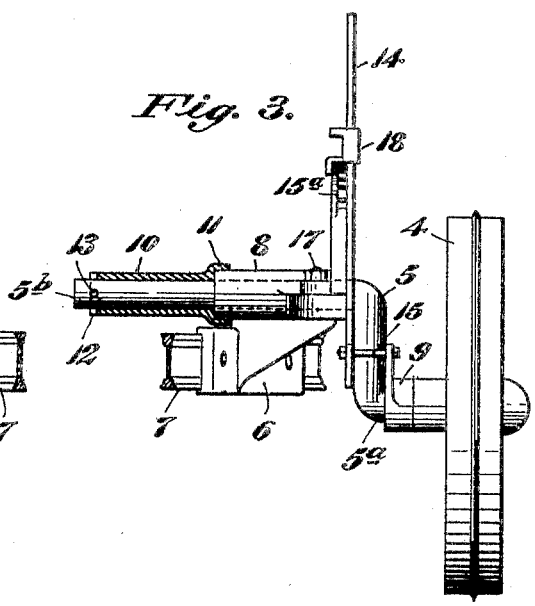

Figure 1 is a plan view of my plow, showing attachment. Fig. 2 is a side elevation of attachment. Fig. 3 is an end elevation of same, partly in section.

In the construction of gang-plows which are interchangeably used for orchard cultivation or for work upon grain or other fields it is desirable to so construct the apparatus that when working in orchards the plows or cultivators may be run close to the shrubs or vines which are to be cultivated and when the device is to be used in open fields where the surface of the land is frequently very uneven it is desirable to increase the width of the wheel-base or the "tread," as it is known, so as to render the plows very steady in their operation and prevent undue oscillations and movements of the frame.

It is the object of my present invention to provide a simple means for producing this result.

The device here shown is applicable to any disk plow or cultivator frame. I have here shown it as applied to diagonally-disposed plow-beams, to which any suitable or desired plowing or cultivating devices may be attached.

As shown in the drawings, A is the frame, having a front furrow-wheel 2 and a rear trailing wheel 3. The land-wheel 4 is journaled upon the crank-axle 5, and it is the adjustment of this wheel and its connected parts which is the subject of my present invention.

6 is a bracket having the interior face fitting the form of the plow-beam 7 in such a manner that it may be rigidly secured thereto by bolts passing through the frame. This bracket carries a horizontally-disposed sleeve 8, through which either arm of the crank-shaft 5 may be fitted and turnable. The crank-shaft is made with two arms $5^a$ and $5^b$. The arm $5^a$ is of sufficient length to receive the hub of the wheel 4 and a collar 9, as shown, these two occupying the entire space between the wheel and the crank portion 5 of this axle. When the device is mounted in this manner and secured to the plow-beam, the wheel 4 will travel very close and will thus allow the plows or cultivators to run correspondingly close to the trees or other parts contiguous to which the cultivation is required. The other end $5^b$ of the axle is considerably longer than the part $5^a$ and extends through the sleeve 8 and to a considerable distance beyond the inner end. This extending portion is inclosed in a sleeve 10 and having an enlarged tubular portion 11, which fits over the end of the sleeve 8. The outer end of the sleeve 10 is preferably formed with semicircular notches, as shown at 12, and a pin 13, passing through the end of the shaft $5^b$ and engaging with the semicircular notches 12, secures the sleeve in position.

When it is desired to extend the wheel-base, by removing the pin 13 and the sleeve 10 the shaft may be withdrawn from the fixed bearing-sleeve 8, and by removing the wheel 4 and the collar 9 the shaft may be reversed and the part $5^a$ inserted into the journal-sleeve 8, while the part $5^b$ will then project to a considerable distance beyond the side of the plow-frame. The part $5^a$ is of such length that it will just pass through the sleeve A and may be retained in place by a pin passing through the end which projects through the sleeve, the same pin-hole being serviceable for this purpose that is employed for retaining the wheel upon this part of the axle when it is used for that purpose. The sleeve 10 is then slipped upon the outer end of the part $5^b$ and slipped up close to the collar 9. The wheel 4 is then placed upon the outer end of $5^b$ and is secured in position by a pin passing through the hole at the outer end, as at 13. The wheel will thus be carried to a distance away from the plow-frame, dependent upon the length of the part $5^b$ of the axle, and will thus correspondingly increase the wheel-base and the steadiness of the apparatus. In order to raise and lower this portion of the plow-frame with relation to the wheel 4, the shaft is turned, and the position of the crank portion 5 controls the elevation and depression. The shaft is turned for this purpose by means of a lever 14, which is here shown as fulcrumed upon the axle, and is secured to the crank portion 5 by a bolt, as at 15, this bolt being here shown as also securing the collar 9 by passing through a flange or extension upon the inner end of the collar.

15ª is a segmental rack which is bolted to the bracket 6, as shown at 17, and thus held in proper relation with the lever 14. The lever 14 is provided with a spring-pressed pawl of any suitable or well-known construction, as shown at 18, and this pawl will engage the notches in the periphery of the segment 15 whenever released.

In my construction I have shown the bracket so bolted to the plow beam or frame that the normal inclination of the crank 5 is forward of the portion of the axle which is journaled and turnable on the frame. Thus when the plows or cultivators are lowered into the ground the lever-arm 14 will be pressed down to the rear of the bracket, so that it is very nearly horizontal and will not present any obstruction to low-hanging branches when used for orchard cultivation.

When the plow-frame is to be raised, the pawl is disengaged from the segment and the lever is lifted. As the wheel 4 stands in front of the journal-boxes 8 and as there is always a certain amount of friction caused by the direction of travel, it will be manifest that by lifting upon the lever this friction and the extension of the crank-arm in front of the box will be of material assistance in raising the plow-frame and will largely prevent breakages from undue strains.

Having thus described my invention, what I claim, and desire to secure by Letters Patent, is—

1. In a disk plow, a frame, a journal-box rigidly supported on said frame, a crank-axle having long and short arms a land-wheel fitting and turnable upon the end of either arm, an independent sleeve fitting the long arm of the axle maintaining said arm in position in the journal-box when fitted thereto, and the wheel in position upon the outer end of said arm when the shaft is reversed.

2. In a disk plow, a plow beam or frame, a fixed horizontal journal-box carried thereby, a crank-shaft having a long and a short arm, a land-wheel adapted to be journaled upon the end of either arm when the other is fitted in the journal-box, a sleeve having an enlarged tubular end to fit the end of the journal-box and inclose the projecting end of the long arm of the shaft when said arm is within the journal-box, said sleeve fitting between the wheel and the crank portion to increase the distance of the wheel from the plow-beam when the short arm is fitted within the journal-box.

3. In a plow, a beam or frame, a horizontally-fixed journal-box, a crank-shaft having long and short arms both adapted to fit the journal-box, and a land-wheel adapted to fit the outer end of either arm of the crank-shaft, a sleeve fitting the long arm of said shaft and the end of the journal-box, said sleeve having segmental notches in the outer end and a pin passing through the axle, and engaging said notches when the long arm is fitted within the journal-box, and a collar fitting the short arm of the axle against which collar the wheel-hub abuts when mounted upon the short arm.

4. In a disk plow, a beam or frame, a bracket fitting said beam, means by which said bracket is secured thereto, a journal-box horizontally fixed upon the bracket, a crank-axle having long and short ends, a land-wheel fitting and turnable upon either arm of the axle, said axle being reversible so that either the long or the short arm may be turnably supported in the journal-box, a sleeve fitting the long arm of the axle and adapted to maintain it in position when within the journal-box, said sleeve forming a distance-piece interior to the wheel-hub when the axle is reversed, and the wheel mounted upon said long arm.

5. In a disk plow, a plow beam or frame, a bracket, bolts whereby it is secured to the frame, a horizontally-disposed journal-box carried by the bracket, a crank-axle having long and short arms reversible so that either arm may be turnably fitted in the journal-box, a land-wheel also fitting upon either arm of the crank-shaft when the other is fitted to the journal-box, means for maintaining either arm within the box, and a tubular distance-piece fitting the longer arm, said piece inclosing that portion of the long arm which projects beyond the box and fitting between the wheel-hub and the crank-arm when the wheel is mounted upon said long arm.

6. In a disk plow, a plow beam or frame, a bracket adapted to be bolted to said frame, a horizontal journal-box carried by the bracket, a crank-axle having long and short arms each turnably fitted to the journal-box, a land-wheel fitting and turnable upon either arm of the axle when the other is in the journal-box, a lever fulcrumed upon the journaled arm of the axle having its short arm bolted to the crank portion of the axle and a segment concentric with the journal-box having peripheral notches and a pawl carried by the long arm of the lever adapted to engage said notches.

In testimony whereof I have hereunto set my hand in presence of two subscribing witnesses.

WILLIAM S. COOK.

Witnesses:
GEORGE G. HATCH,
JACKSON HATCH.